Aug. 3, 1965　　　A. MARIOTTI　　　3,197,893
SOLAR ORIENTATED GLOBE DEVICE
Filed Dec. 20, 1962　　　3 Sheets-Sheet 1

Anthony Mariotti
INVENTOR.

BY *Clarence A. O'Brien*
*and Harvey B. Jacobson*
Attorneys

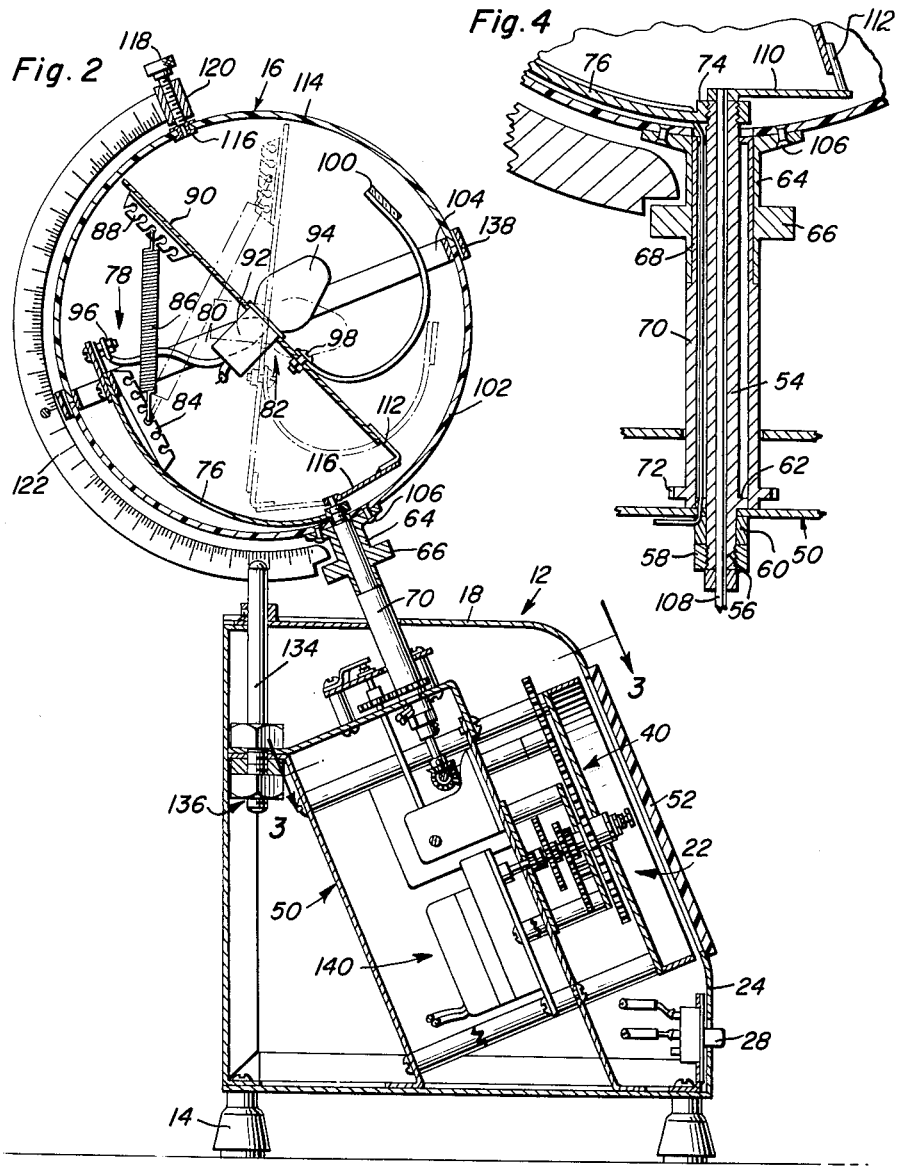

Aug. 3, 1965   A. MARIOTTI   3,197,893
SOLAR ORIENTATED GLOBE DEVICE
Filed Dec. 20, 1962   3 Sheets-Sheet 3

Anthony Mariotti
INVENTOR.

United States Patent Office 3,197,893
Patented Aug. 3, 1965

3,197,893
SOLAR ORIENTATED GLOBE DEVICE
Anthony Mariotti, 16198 Merrill Ave., Fontana, Calif.
Filed Dec. 20, 1962, Ser. No. 246,129
4 Claims. (Cl. 35—45)

This invention relates to an illuminated type of globe device particularly usable for educational purposes.

A primary object of the present invention is to provide an illuminated globe device that may be continuously orientated in accordance with the time of day and the position of the earth relative to the sun.

Another object of the present invention is to provide an illuminated globe device, the illumination of which may provide an indication of the relative position of the earth and sun so as to provide a seansonal indication.

A still further object of the present invention is to provide an illuminated and solar orientated globe device which features a selectively illuminated clock and calendar mechanism which is drivingly connected to an illuminated globe for proper orientation thereof in accordance with the time and day of the year.

An important feature of the illuminated globe device of the present invention resides in the mounting of the globe device with respect to the frame assembly including the rearwardly inclined mounting rod about which the globe and time positioning member is rotatably mounted while a solar orientating actuating member is journaled therewithin for displacing a source of illumination mounted internally of the globe in accordance with the simulated position of the sun with respect to the earth.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a side sectional view of the globe device taken substantially through a plane indicated by section line 2—2 of FIGURE 1;

FIGURE 4 is an enlarged partial sectional view of the globe mounting;

Figure 1:
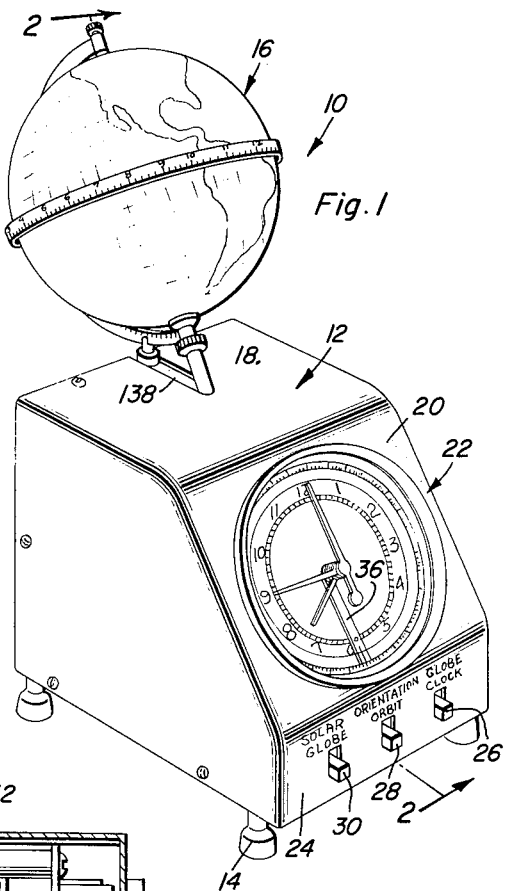
FIGURE 1 is a perspective view of one form of illuminated globe device constructed in accordance with the principles of the present invention.
Figure 5:
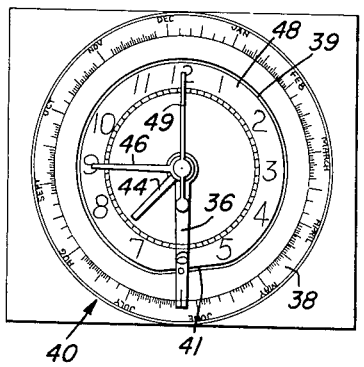
FIGURE 5 is a front elevational view of the clock and calendar dial mechanism.
Figure 3:
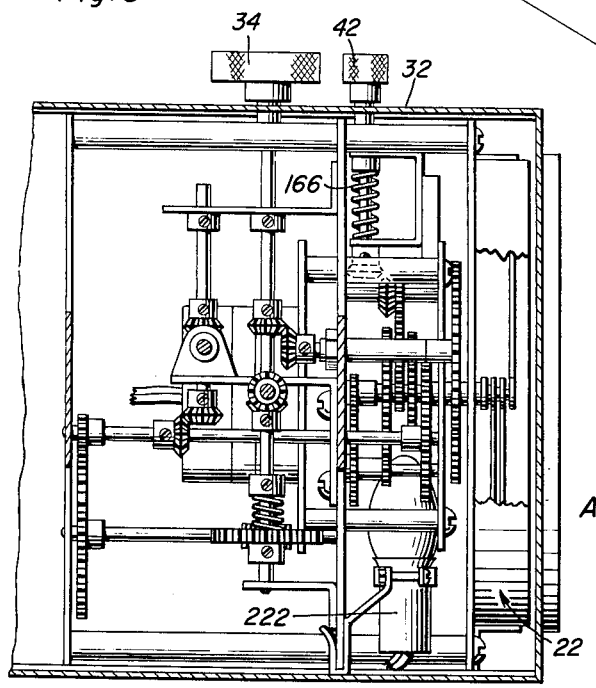
FIGURE 3 is a sectional view taken substantially through a plane indicated by section line 3—3 in FIGURE 2.

Referring now to the drawings in detail, it will be observed from FIGURE 1 that the illuminated globe device generally referred to be reference numeral 10 includes a frame mounted housing generally referred to be reference numeral 12 supported on a plurality of resilient feet elements 14. Projecting upwardly at a rearwardly inclined angle to the housing assembly 12, is the globe assembly generally referred to be reference numeral 16 which is illuminated internally thereof as will be explained hereafter. The globe assembly extends upwardly from the upper portion 18 of the housing which is also provided with a front face portion 20 rearwardly inclined at the same angle as the globe assembly and exposing therethrough a dial face of a position indicating mechanism generally referred to by reference numeral 22. On a lower portion 24 of the front face of the housing there are provided a plurality of switch actuators including the switch actuator 26 for controlling the power supply for the clock mechanism associated with the globe device, the switch actuator 28 by means of which the position indicating mechanism face is illuminated and the switch actuator 30 by means of which the globe assembly 16 is internally illuminated. Also projecting from one of the side faces 32 of the housing as more clearly seen in FIGURE 3 is a manually operated knob 34 by means of which illumination of the globe assembly is controlled in accordance with the time of year and by means of which the calendar indicating pointer 36 of the position indicating mechanism 22, is positioned to the proper location on the calendar scale 38 formed on the radially outer perimeter portion of the dial 40 in generally concentric relation to the curve 39 as more clearly seen in FIGURE 5. It will be noted however that the curve 39 has a flat portion which has been empirically calculated from observed discrepancies between time and rate of sun movement. The manual knob 42 projecting from the face 32 of the housing adjacent to the manual knob 34 is also operative upon movement inwardly thereof against a spring bias, to properly set the hour hand 44, and the minute hand 46 of the clock mechanism associated with the globe device, said time indicating hands cooperating with the clock face portion 48 on the position indicating dial 40. A second hand 49 is also associated with the clock mechanism.

Referring now to FIGURE 2 in particular, it will be observed that the housing 12 encloses therewithin a frame assembly generally referred to be reference numeral 50 in a rearwardly inclined position, the frame assembly mounting the position indicating dial 40 for exposure through a window 52 in the front face portion 20 of the housing. Secured to the frame assembly 50 and projecting upwardly at the same rearwardly inclined angle, is a hollow mounting rod member 54 as more clearly seen in FIGURE 4. The mounting rod member 54 is secured to the frame assembly 50 by means of a threaded end portion 56 which receives a lock nut member 58 in abutting relation to a spacer element 60 clamping the mounting rod member 54 to the frame assembly in cooperation with the lower thrust flange 62 on the mounting rod member 54. The globe assembly 16 is rotatably mounted about an upper portion of the mounting rod member 54 by means of a rotor element 64 being provided with a knurled knob portion 66 to accommodate manual reorientation of the globe assembly. The rotor element 64 is rotatably mounted on a reduced diameter portion 68 of a solar orientating shaft member 70 which is journaled about the rod member 54 and in engagement with the rotor element 64 so as to impart rotational movement thereto. The lower end portion of the solar orientating shaft member 70 is therefore provided with a gear formation 72. Although any suitable overrunning clutch mechanism may be provided between the shaft member 70 and the rotor element 64 so as to impart rotation thereto yet permit manual rotation of the rotor element with respect to the shaft member 70, it has been found that the weight of the globe assembly 16 on the rotor element will be sufficient to provide driving engagement between the rotor element and the shaft member 70 for imparting rotation to the globe assembly. It will also be observed that the upper end of the mounting rod member 54 projects into the globe assembly and is externally threaded for connection to one end 74 of an arcuate frame member 76 forming part of a bracket assembly 78 mounted internally of the globe assembly.

The bracket assembly 78 is provided adjacent its upper end with a forwardly projecting pivotal supporting member 80 by means of which an illumination device generally referred to by reference numeral 82 is pivotally mounted about a horizontal axis perpendicular to and intersecting the rearwardly inclined axis extending through the mounting rod member 54. Secured to the bracket frame member 76 is an adjustable notch anchoring element 84 to which one end of a spring element 86 is connected, the opposite end of the spring element being connected to a similar notched anchoring element 88 secured to the rear side of a circular reflector disk 90 of the illumination device 82. Mounted centrally of the disk 90 is a bulb socket 92 adapted to receive the lamp bulb 94, the bulb socket being electrically connected to a terminal post 96 secured to the upper end of the frame member 76. The frame member 76 may therefore support an electrical conductor which extends into the hollow shaft member 70 alongside of the fixed mounting rod member 54 as indicated in FIGURE 4. The electrical conductor may thereby extend in non-interfering and hidden relation from the globe assembly through an aperture formed in the lower flange portion 62 of the rod member aligned with an aperture in the frame assembly and out of an aligned opening in the spacer element 60. Electrical energy is thereby conducted to the lamp socket 92 for illuminating the lamp bulb 94. Also mounted by the fastener 98 on the disk 90, is a lens element 100 aligned with lamp bulb 94 and disposed adjacent to the external surface of the globe assembly for spot illumination thereof in accordance with the simulated position of the sun relative to the earth.

The globe assembly 16 includes a lower hemispherical shell portion 102 which is made of translucent material. The upper circular rim of the lower shell portion 102 is provided with an internally secured ring 104 while the lower portion of the lower shell 102 is secured by rivets 106 to the rotor element 64. Journaled within the rod mounting member 54 and projecting upwardly therefrom into the lower shell portion 102, is a time positioning shaft 108. Secured to the upper end of the shaft 108, is a crank element 110 to which an engaging finger element 112 is secured. Accordingly, in response to rotation of the shaft 108, and the crank element 110 connected thereto, the engaging finger 112 will impart an oscillatory stroke to the reflecting disk 90 and the surface location of the concentrated illumination from the bulb lamp 94 in order to simulate the shifting movement of the sun with respect to the earth as well as the hemispherical portion of the globe that would be exposed to the general illumination of the sun in the position represented by the concentrated illumination.

Displacement of the disk 90 by the engaging finger 112 will occur against the bias of the spring elements 86 which holds the disk 90 in engagement with the engaging finger 112. Complete enclosure of the bracket assembly 78 and the illuminating device 82 within the globe assembly is accomplished when the upper hemispherical shell 114 is placed in assembled relation over the annular ring 104 secured to the upper rim of the lower shell 102. It will be observed, therefore, that the upper portion of the upper shell 114 is provided with a grommet 116 adapted to receive the retractable pivot end of a locking element 118 threadedly mounted within a sleeve 120 fixed to the upper end of a semi-circular latitude indicating scale member 122. The latitude scale member 122 is therefore secured to the frame assembly 50 by means of the mounting rod 134 secured to the frame assembly by the fastener assembly 136 within the housing 12. The upper face portion 18 of the housing is therefore provided with a slot 138 for assembly of the housing over the frame assembly accommodating the mounting rod 54 and the mounting rod 134 projecting upwardly therefrom. Also secured to the latitude scale member 122 intermediate the ends thereof is a longitude indicating scale member 138 in the form of an annular ring disposed in concentric relation to the annular ring 104 secured to the upper rim of the lower globe shell 102. Latitude and longitudinal readings may thereby be taken with respect to desired locations on the map printed on the external surface of the globe shell portions 102 and 114.

Figure 6:
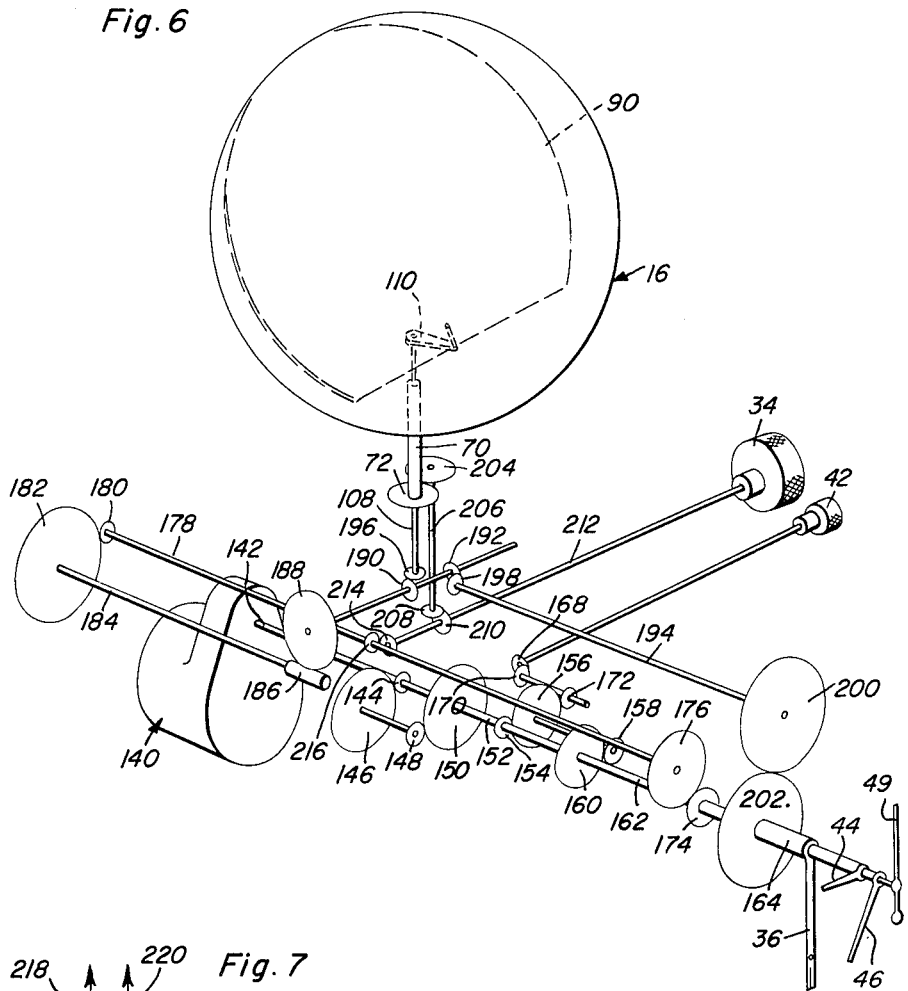
FIGURE 6 is a diagrammatic perspective view of the drive train arrangement involved in the globe device of the present invention.

Mounted within the frame assembly 50 and disposed rearwardly of the globe position indicating mechanism 22, is an electric clock drive mechanism 140 from which power is derived for imparting movement to the time positioning shaft member 70 and for the time indicating hand of the position indicating mechanism 22. Referring to FIGURE 6 in particular, it will be observed that the motor driven clock mechanism 140 is provided with an output shaft 142 to which the pinion 144 is secured and to which the second hand 49 is secured for rotation by one revolution each minute upon energization of the mechanism 140. The pinion 144 is therefore geared to the minute hand 46 by means of the compound gear and pinion 146 and 148 meshing with the gear 150 secured to a sleeve 152 to which the minute hand 46 is connected. The hour hand 44 is in turn geared to the sleeve 152 by means of the pinion 154 secured to the sleeve 152 and in mesh with the gear 156 to which the pinion 158 is connected, said pinion 158 being in mesh with the gear 160 secured to the sleeve 162 to which the hour hand 44 is connected. Journaled on the hour hand sleeve 162 is the sleeve 164 to which the calendar indicator 36 is connected. In order to set the hands of the time indicating clock mechanism, the setting knob 42 is pushed inwardly against the bias of the spring 166 as seen in FIGURE 3 so that the bevel gear 168 connected to the knob 42 may mesh with the bevel gear 170 which in turn is connected to a gear 172 meshing with the gear 156 in the drive train for the hour hand 44. Also geared to the hour hand sleeve 162 by means of the pinion 174 is the gear member 176 connected by shaft 178 to the pinion 180 which in turn meshes with the gear 182 connected by shaft 184 to the worm 186. The worm 186 in turn meshes with a worm wheel 188 which is drivingly connected by the bevel gears 190 and 192 to the solar orientating shaft 108 and the calendar indicator drive shaft 194 by means of the bevel gears 196 and 198, respectively. The drive shaft 194 for the calendar indicator 36 is therefore geared to the calendar indicator sleeve 164 by the meshing gears 200 and 202. It will therefore be appreciated that through the foregoing gear train motion will be imparted to the time indicating clock hands 49, 44 and 46 in accordance with the time of day and also slowly imparting rotation to the solar orientating shaft 108 for displacing the illuminating disk 90 through the crank arm 110 connected to the shaft 108. Also rotation will be imparted to the globe assembly 16 by means of the shaft 70 in accordance with the time of day. Accordingly, the gear formation 72 at the lower end of the shaft 70 meshes with a gear 204 connected by shaft 206 to the bevel gear 208 which in turn meshes with the bevel gear 210 on the shaft 212 to which the manual knob 34 is connected. The other end of the shaft 212 is connected to a bevel gear 214 which in turn meshes with a bevel gear 216 fixed to the shaft 178 which is geared to the calendar indicator sleeve 164. Accordingly, the calendar indicator 36 may be manually set while at the same time the illuminating reflector disk 90 will be positioned in accordance therewith.

Figure 7:
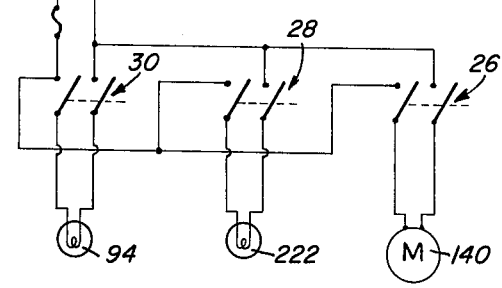
FIGURE 7 is an electrical circuit diagram associated with the globe device of the present invention.

Referring now to FIGURE 7, it will be observed that upon closing of the switch device 26, a circuit is established from the power lines 218 and 220 through the motor of the clock mechanism 140 for energization thereof. Movement may thereby be imparted to the rotating parts of the globe device including movement of the clock hands, the calendar indicator 36, the illuminating device 82 and rotational movement of the globe assembly 16. Upon closing of the switch device 30, a parallel circuit is established through the lamp bulb 94 so as to internally illuminate the globe assembly as hereinbefore indicated. Illumination will be confined to the forward side of the disk 90 which is shiftable in accordance with the time of the year as hereinbefore indicated so as to illuminate the globe in a fashion simulating the movement of the sun with respect to the earth. Also mounted rearwardly of the position indicating device, is a lamp bulb device 222 as more clearly seen in FIGURE 3 arranged to illuminate when energized the dial face 40. Accordingly, illumination of the position indicating device is produced upon closing of the switch device 28 as indicated in the circuit diagram of FIGURE 7.

From the foregoing description operation and utility of the illuminated globe device of the present invention will be apparent. It will therefore be appreciated that the arrangement of the present invention involves a compact assemblage of parts cooperating to firmly mount the globe assembly above the base housing providing a time and calendar indication, the globe assembly being rotated in accordance with the time indicated so as to expose one-half of the globe device to the direct and reflected illumination originating from an illuminating source mounted internally of the globe assembly adjacent the rotational center. The illuminating source is also angularly shifted about said center in accordance with the time of year indicated on the position indicating device simulating the movement of the sun with respect to the earth. The position of the sun is also more precisely represented by the concentrated illumination transmitted through the lens 100. Also mounted on the housing below the position indicating device are electrical switch devices whereby the position indicating dial and the globe assembly may be illuminated when desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An illuminated solar orientated globe device comprising, supporting frame means, mounting rod means fixedly secured to said frame means and projecting upwardly therefrom at a rearward inclination, globe means rotatably mounted about an upper portion of said mounting rod means, time positioning means rotatably mounted about said rod means in engagement with said globe means for imparting movement thereto about an inclined axis extending through said rod means, bracket means fixed to an upper end of said rod means within said globe means, illumination means movably mounted by said bracket means, solar orientating means journalled within said rod means and projecting upwardly therefrom into engagement with said movable illumination means for displacement thereof with respect to the globe means, position indicating means mounted on said frame means below the globe means for indicating the relative position of the globe means and the illumination means, drive means drivingly connecting said position indicating means to said time positioning means and said solar orientating means for simultaneous movement relative to each other, said drive means including a clock mechanism for imparting movement to said position indicating means and said time positioning means, manually operated means for imparting movement to said position indicating means and said solar orientating means, and power means operatively connected to said clock mechanism, illuminating means and position indicating means for selective energization thereof, said solar orientating means comprising a shaft journalled in said mounting rod means, a crank connected to an upper end of said shaft and an engaging finger connected to said crank, said illumination means comprising a circular reflector disk rotatably mounted by the bracket means about a horizontal axis perpendicular to and intersecting said inclined axis, bulb means mounted on said disk, lens means secured to said disk in alignment with the bulb means adjacent to an internal surface of said globe means, and spring means adjustably connecting the bracket means to the disk for biasing thereof to one position.

2. The combination of claim 1 wherein said bracket means comprises an arcuate electrically conductive frame member secured at one end to the rod means and projecting upwardly and rearwardly therefrom, a pivotal support member secured adjacent to an end of the frame member opposite said one end for pivotally mounting said illumination means, and an electrical terminal mounted at said opposite end of the frame member for electrical connection thereof to the illumination means.

3. The combination of claim 2, wherein said globe means comprises a lower hemispherical shell having an upper rim, rotor means fixed to said lower shell and projecting downwardly therefrom for journaling about said upper portion of the rod means, a latitude scale member secured to said frame means in close rearwardly spaced relation to said lower shell, a longitude ring member secured to said latitude scale member in coaxial relation to the upper rim of the lower shell, an upper hemispherical shell removably seated on said upper rim of the lower shell and lock means mounted on an upper end of the latitude scale member for engaging the upper shell to hold it in assembled relation.

4. An illuminated solar orientated globe device comprising, supporting frame means, mounting rod means fixedly secured to said frame means and projecting upwardly therefrom at a rearward inclination, globe means rotatably mounted about an upper portion of said mounting rod means, time positioning means rotatably mounted about said rod means in engagement with said globe means for imparting movement thereto about an inclined axis extending through said rod means, bracket means fixed to an upper end of said rod means within said globe means, illumination means movably mounted by said bracket means, and solar orientating means journalled within said rod means and projecting upwardly therefrom into engagement with said movable illumination means for displacement thereof with respect to the globe means; said illumination means comprising a circular reflector disk rotatably mounted by the bracket means about a horizontal axis perpendicular to and intersecting said inclined axis, bulb means mounted on said disk, lens means secured to said disk in alignment with the bulb means adjacent to an internal surface of said globe means, and spring means adjustably connecting the bracket means to the disk for biasing thereof to one position.

References Cited by the Examiner

UNITED STATES PATENTS

| Re. 8,666 | 4/79 | Juvet. | |
| 2,055,969 | 9/36 | Farreng | 58—44 |
| 2,785,528 | 3/57 | Kernick | 58—44 |
| 2,907,166 | 10/59 | Baccara | 58—44 |
| 3,014,287 | 12/61 | Ernst | 35—47 |

FOREIGN PATENTS

| 857,291 | 2/53 | Germany. |
| 3,179 | 1912 | Great Britain. |

JEROME SCHNALL, *Primary Examiner.*